United States Patent [19]
Hebert

[11] 3,907,717
[45] Sept. 23, 1975

[54] ACRYLIC RESISTIVE COATING COMPOSITION
[75] Inventor: James Michael Hebert, Humboldt, Iowa
[73] Assignee: Globe-Union Inc., Milwaukee, Wis.
[22] Filed: Aug. 24, 1973
[21] Appl. No.: 391,285

[52] U.S. Cl. .................. 252/508; 252/511; 338/13
[51] Int. Cl.² ........................................ H01B 1/06
[58] Field of Search .......... 252/508, 511; 260/42.29

[56] References Cited
UNITED STATES PATENTS
| | | | |
|---|---|---|---|
| 3,301,743 | 1/1967 | Fekete et al. | 260/836 X |
| 3,373,075 | 3/1968 | Fekete et al. | 260/42.28 X |
| 3,491,056 | 1/1970 | Saunders et al. | 252/511 X |

Primary Examiner—Benjamin R. Padgett
Assistant Examiner—E. Suzanne Parr
Attorney, Agent, or Firm—James L. Kirschnik; John Phillip Ryan

[57] ABSTRACT

An electrically resistive coating composition exhibiting low resistivity when applied to a dielectric substrate employing inexpensive materials and without utilizing a solvent during application to the substrate. The conductive particles are carbon and are intermixed in a heat curable thermosetting acrylic resin which is a reaction product of acrylic or methacrylic acid and a polyepoxide of a phenol formaldehyde resin. The composition can be further polymerized with itself or with copolymerizable monomers such as styrene, vinyl toluene, methyl-methacrylate and ethylene glycol dimethacrylate. This thermosetting acrylic polymerization product is combined with an ethylene glycol dimethacrylate monomer into which are admixed conductive carbon particles and a filler material. The resulting product is cured with an organic curing agent and the resulting product fired onto a substrate at a temperature of at least 700°F.

24 Claims, No Drawings

ACRYLIC RESISTIVE COATING COMPOSITION

BACKGROUND OF THE INVENTION

This invention relates to an electrically resistive coating composition especially adaptable to being screen applied to a dielectric base for the manufacture of resistors and like electrical elements. More particularly, this invention relates to electrically resistive paint-like, plastic coating compositions composed of a thermosetting acrylic paint material which can be fired onto a dielectric substrate at a temperature of at least 700°F. so as to provide a very stable and low resistive material.

Resistive coating materials of the type concerned with in this invention are usually composed of phenolic resins such as the novolaks which are combined with conductive particles such as carbon to form a coating composition which can be applied to a dielectric substrate as a component in a fixed or variable resistor. The prior art phenolic resins can be mixed or copolymerized with epoxy resins and epoxy modified phenolic resins. Epoxy, diallylphthalate and urethane resins have also been utililized.

It is common practice to apply carbon containing resistor elements to dielectric substrates and in conjunction with silver or other metallic patterns by means of screening with a solvent containing paint. Such procedures require numerous passes so as to apply sufficient quantity of material on the substrate. Further, solvent systems have a relatively short pot life so that the system must be cleaned often if it is to be inoperable for a long period of time. The presently available carbon resistive systems have high resistive values and low resistive values are normally only obtained utilizing expensive noble metals or precious metals such as silver. Neither are the presently available carbon resistor systems stable at extreme temperature exposures or where high humidity is incurred wide variations in resistance readings result.

The preferred particular variable resistor in which the composition of this invention is well suited is commonly referred to as a fader resistor control system such as normally employed with Hi-Fi and Stereo sound reproducing equipment. An arc-like resistor path of higher resistance is disposed between two portions of a lower resistance material such as silver. Electrical connections are made through the silver portions as well as to a double wiper contact which carries a common electrical input and moves over the silver portions. Upon engaging the carbon-containing resistor element, a different electrical characteristic is imparted to an electrical circuit so as to vary its resistance and provide a different amplification of sound to the desired speaker. A component of this type is available from the Centralab Division of Globe-Union Inc. as Part No. BA-1900 Series. The composition of this invention can also be utilized in a resistor element for potentiometers and similar variable resistor devices.

It is an object of the present invention to provide a novel carbon variable resistor composition which is highly stable and offers low resistance values. It is another object of this invention to provide a novel resistor paint-like coating composition which can be applied to a substrate without a solvent. It is still another object of this invention to provide a carbon containing resistive coating composition which can be applied to a dielectric substrate with a single screening procedure. It is yet another object of this invention to provide a resistive coating composition which upon application to a dielectric substrate will give good uniformity of resistance over the entire length of the resistive path as well as good hop-off characteristics between adjacent resistive coatings having different resistive characteristics.

SUMMARY OF THE INVENTION

The foregoing objects are accomplished and the shortcommings of the prior art are overcome by the present resistive coating composition which is solvent free and capable of being applied to a dielectric base. The coating composition is comprised of a thermosetting acrylic resin which is present in an amount of about 35 to about 70% by weight, a carbon conductor present in an amount of about 3 to about 60% by weight and an inorganic filler material in an amount of about 5 to about 50% by weight. In order to cure the thermosetting acrylic resin composition about 0.1 to about 2% by weight of an organic curing agent is utilized. The thermosetting acrylic resin compositions are condensation products of acrylic or methacrylic acid and a polyepoxide of a phenol formaldehyde resin. This basic condensation product is preferably copolymerized with ethylene glycol dimethacrylate and ethylene glycol dimethacrylate monomer is utilized in addition to the copolymerized product to act as a vehicle. The composition containing the carbon particles, inorganic filler and curing agent are cured on a dielectric substrate in a kiln at temperatures of at least 700°F so as to result in a coated substrate having a carbon resistor which is highly stable to temperature variations as well as humidity.

DETAILED DESCRIPTION OF PREFERRED EMBODIMENTS

The following Examples are presented to better illustrate the invention, however, they are not intended to limit the invention to the times, conditions or materials set forth.

EXAMPLE I

The resistive coating composition used for fabricating resistors in accordance with this invention contains the following ingredients:

| Ingredients | Grams |
| --- | --- |
| Thermosetting Acrylic Resin | 236.6 |
| Ethylene glycol dimethacrylate | 29.1 |
| Calcined Statex | 68.2 |
| Activated Alumina | 139.1 |
| Graphite | 125.0 |

The thermosetting acrylic resin is a reaction product of acrylic acid and a polyepoxide of phenol formaldehyde resin known as Dow DEN-438. This latter material is available from Dow Chemical Company and has a molecular weight of 650 and an epoxide equivalent of 175-182. One equivalent weight of acrylic acid is provided for each equivalent weight of epoxide in this composition. The reaction product of the polyepoxide with the acrylic acid is free of any unreacted epoxy groups and also contains terminal acrylic or methacrylic groups which can be further polymerized with vinyl monomers or with themselves. The composition is described in U.S. Pat. No. 3,301,743. This particular reaction product is in turn reacted with a monomer of ethylene glycol dimethacrylate in the proportions of about 66 parts by weight of ethylene glycol dimethacrylate to 100 parts by weight of the reaction product of acrylic acid with the indicated phenol formaldehyde resin. The uncured resin will have the following properties:

| Test | Value |
| --- | --- |
| Color, Gardner | 3 |
| Weight per Gallon | 9.68 lbs |
| Specific gravity, 25°/25°C | 1.163 |
| Viscosity, 25°C | 4500 cps |

The additional ethylene glycol dimethacrylate in the amount of 29.1 grams is a standard material sold under the name SR 206 by Sartomer Resins Inc.

The conductive carbon particles are provided in the form of air calcined carbon which in this particular instance the carbon particles were obtained from Columbia Carbon under the brand name Statex 93. These particular carbon particles are calcined in air at elevated temperatures in the order of 2000 to 3,000°F for several hours and the carbon particles range in size from about 10 to about 400 millimicrons.

The graphite is utilized in conjunction with the carbon to lower the resistance and is available from the Centralab Division of Globe-Union, Inc. It is of the crystalline type and has an average particle size of 26 millimicrons with an average surface area of 5.5m²/gram.

The activated alumina serves as an inorganic filler material and ranges in size from ½ to 40 microns. It is available from the same source as the graphite.

The admixing of the previous materials and application to a dielectric substrate is as follows. The thermosetting acrylic resin is placed in a suitable mixing bowl and the ethylene glycol dimethacrylate is added to it and mixed for a period of ten minutes. After the ten minute period, all of the calcined Statex, then all of the activated alumina and subsequently all of the graphite are added over a period of 15 to 18 minutes. After this period of time, the mixer is stopped and the sides are scraped down after which mixing for approximately 30 minutes is continued. This initial paint preparation will then subsequently be milled on a three-roll mill with the first and second rolls having a 7.5 mil gap and the third roll having a 22 mil gap from the second roll. The previously prepared paint material will be fed into the feed rolls and the roll mill adjusted so that a paint coating on the third roll appears thin and uniform. The entire batch of paint is passed through the mill three times. After the third pass it is stored at a temperature below 40°F.

Depending upon production schedules and availability of equipment, the milled paint can be catalyzed immediately after milling or after a storage period. The particular curing catalyst employed is ditertiary butyl peroxide which is available from U.S. Peroxygen. The catalyst is added in an amount of ½ gram for every 100 grams of the paint, with slow stirring for a period of approximately 30 seconds. The mixer is then stopped, the sides scraped down and the mixing continued for another 30 to 50 seconds. The paint material is then ready for use or it can be stored at a temperature of below 40°F.

The previously prepared catalyzed paint material is conveniently applied to a fired dielectric substrate utilizing a standard Presco model 350 screening machine as follows:

| Resistor Screen: | | 150 mesh S.S. |
| --- | --- | --- |
| Squeegy Material: | Amber Polyplastic: | |
| | Hardness- | 80 |
| | Durometer | 45°Angle |
| Downstop: | | 5 mils |
| Squeegy Pressure: | | 7 pounds |
| Breakaway: | | 60 mils |
| Squeegy Speed: | Right: | 4.6 in./sec. |
| | Left: | 3.9 in./sec. |
| Squeegy Pickup: | | ¾ to 1 inch beyond pattern |

The screened parts are next "gelled" in a batch oven for about 10 minutes at approximately 125°C within approximately 30 minutes after they are screened. These parts are then cured in a standard kiln within three days after they are gelled. The gelled parts are kiln cured in a 1 hour cycle with a kiln profile peak of 700°F. The kiln preferably utilized is a four zoned kiln where the first zone has a temperature of 230°C; the second 370°C; the third 375°C and the fourth 280°C. A 6 minute high temperature of approximately 700°F in the third zone is essential to afford the necessary stabilization of the resistor material.

Standard tests were conducted on the material such as for hopoff, power, extreme temperature exposure, humidity, rotational life and load life. In the instance of the hopoff, power and rotational life tests, the resistive material of this invention was comparable to that of a standard carbon-phenolic resin resistor material. Concerning the tests for extreme exposure, humidity, and load life, the thermosetting acrylic material of this invention was considerably better than that utilizing the carbon-phenolic base material. For example, the extreme temperature exposure comprises subjecting ten units to five cycles of −50°C to +85°C and then testing the change in terms of percentage concerning resistance variation. In the instance of the carbon-phenolic material a −3.34% change was indicated for an average of ten units whereas in the instance of the thermosetting material it was only 0.733% on the average. As to the humidity test which is conducted over a period of 96 hours at 95% relative humidity and 30°C, the carbon-phenolic based material showed an average percentage change for ten units of 14.1 as compared to 2.8% for the thermosetting acrylic resistive material. Comparative tests were also conducted on loadlife at 100 and 200 hours utilizing temperature of 70°C and 1.5 watts. The results of these tests showed an average change in resistance of 12.1% for 10 carbon-phenolic units as compared to an average of 5.072% for an average of 50 units employing the paint material of this invention. At 200 hours the average change in resistance was 30% for 10 units of the carbon-phenolic material as compared to 9.005% for 50 units of this invention.

Further, approximately 300,000 parts made from about 200 production runs utilizing the composition of this invention were consistently found to have resistances within accepted limits.

The following is another Example of a formulation which can be utilized to make the thermosetting acrylic resistive material of this invention. It will be noted that unlike the previous Example, the graphite has been eliminated. The ingredients are as follows and are the same as described in Example I:

EXAMPLE II

| Material | Weight in Grams |
| --- | --- |
| Thermosetting acrylic | 527.2 |
| Ethylene glycol dimethacrylate | 58.2 |
| Calcined Statex | 136.4 |
| Activated alumina | 278.2 |

This material is formulated and processed in the same manner as that indicated in the previous Example and would have the same characteristics as indicated in the test data previously presented.

In the previous Examples I and II, the amounts of thermosetting acrylic resin are 42 and 52%, respectively, indicating a useful range of resin material. It should be understood that the advantages of this invention can also be effected when the resinous material is utilized in the range of 35 to 70% by weight based on the total resin composition in conjunction with the ethylene glycol dimethacrylate. Further, the carbon conductor as represented by the calcined Statex and graphite can range from 3 to 60% and the inorganic filler material from 5 to 50% by weight. The amount of catalyst utilized is not critical and can range from 0.1 to 2% by weight based on the weight of paint material.

While the preferred acrylic acid-polyepoxide phenol formaldehyde reaction product is copolymerized with ethylene glycol dimethacrylate, other copolymerizable monomers such as copolymerizable monomers containing a reactive vinyl group such as acrylic acid, alkyl acrylic acids including methacrylic acid, alkyl esters and amides of acrylic and methacrylic acid including methyl-methacrylate, trimethylol propane trimethylacrylate, diethylene glycol dimethyacrylate, diacetone acrylamide; as well as diallyl phthalate, triallyl cyanurate, styrene, vinyl toluene, divinyl benzene; and the reaction products of a glycol with an alpha-beta ethylenically unsaturated dicarboxylic acid or anhydride such as fumaric and maleic acid esters of glycols. Copolymerizable monomers also include polyhydroxy diacrylate esters of acrylic acid and diglycidyl ethers of Bisphenols, for example, the reaction product of methacrylic acid and the diglycidyl ether of Bisphenol-A, could be substituted for ethylene glycol dimethacrylate. All of the foregoing are indicated in U.S. Pat. Nos. 3,301,743 and 3,373,075.

Ethylene glycol dimethacrylate is utilized in conjunction with the thermosetting acrylic resin for the purpose of acting as a viscosity modifying agent. Other viscosity modifying agents such as the previously referred to copolymerizable monomers as well as linear polyesters made from dibasic acids as represented by adipic or azelaic acids reacted with glycols as represented by propylene glycol could be substituted for this particular material.

Alumina is the preferred inorganic filler material indicated in the previous examples. It should be understood that, while not producing as an effective resistor material, it could be eliminated or other inorganic fillers such as molybdenum disulfide, calcium carbonate or mica could be substituted.

Neither is the type of catalyst essential as other free radial cross linking catalysts could be substituted for the ditertiary butyl peroxide such as benzoyl peroxide, methyl ethyl ketone peroxide and tertiary butyl perbenzoate.

While the preferred dielectric substrate is alumina other inorganic materials such as mica, steatites and titanates, as well as high temperature resinous plastics such as silicone and polymide materials could be utilized in conjunction with the coating composition of this invention.

It will thus be seen that through the present invention there is now provided a thermosetting, electrically resistive coating composition which can be fired onto a substrate at a high temperature so as to effect a highly stable resistor with consistently repeatable performance. The resistive composition is applied without the utilization of a solvent and can produce resistive coating on a substrate with only a single pass of a screening machine. The resistor is also extremely low in resistivity having a resistance of 1.5 to 4 ohms per square inch and finds utilization in a low resistive system which must be below 35 ohms. Further, the composition can be applied with standard techniques and without utilizing special equipment or specially trained operators.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

I claim:

1. A heat-curable, electrically resistive coating composition which is solvent free and capable of being screen applied to a dielectric base comprising a thermosetting acrylic resin present in an amount of about 35 to about 70% by weight, a carbon or graphite conductor present in an amount of about 3 to about 60% by weight and an amount of an organic curing agent sufficient to effect cross-linking of said resin, said composition having low resistivity and capable of being fired onto said dielectric substrate at a temperature of at least about 700°F.

2. The coating composition of claim 1 wherein said thermosetting acrylic resin is composed of polymers of an acrylic resin reaction product and ethylene glycol dimethacrylate.

3. The coating composition of claim 2 wherein said acrylic resin reaction product is a reaction product of acrylic acid and a phenol formaldehyde polyepoxide.

4. The coating composition as defined in claim 1 wherein said carbon is calcined.

5. The coating composition as defined in claim 4 further including graphite in combination with said calcined carbon.

6. The coating composition as defined in claim 1 further including a filler material composed of alumina and present in an amount of about 5 to about 50% by weight.

7. The coating composition as defined in claim 1 further including a viscosity modifying agent.

8. The coating composition as defined in claim 4 wherein said carbon particles range in size from about 10 to about 400 millimicrons.

9. The coating composition as defined in claim 8 wherein said thermosetting resin is present in the range of about 42 to about 52% by weight.

10. An electrical carbon resistor element having low resistivity and high stability comprising a dielectric base and a heat cured coating composition covering at least a portion of said base formed from a cured thermosetting acrylic resin present in an amount of about 35 to about 70% by weight and, a carbon conductor present in an amount of about 3 to about 60% by weight.

11. The electrical carbon resistor element as defined in claim 10 wherein said acrylic resin is composed of polymers of an acrylic resin reaction product and ethylene glycol dimethacrylate.

12. The electrical carbon resistor element as defined in claim 11 wherein said reaction product is a reaction product of acrylic acid and a phenol formaldehyde polyepoxide.

13. The electrical carbon resistor element as defined in claim 10 wherein said carbon is calcined.

14. The electrical carbon resistor element as defined in claim 13 further including graphite in combination with said calcined carbon.

15. The electrical carbon resistor element as defined in claim 10 further including a filler material composed of alumina and present in an amount of about 5 to about 50% by weight.

16. The electrical carbon resistor element as defined in claim 13 wherein said carbon particles range in size from about 10 to about 400 millimicrons.

17. The electrical carbon resistor element as defined in claim 10 wherein said thermosetting acrylic resin is present in an amount of about 42 to about 52% by weight.

18. A method of fabricating a carbon resistor free of a solvent comprising admixing about 35 to about 70% by weight of a thermosetting acrylic resin about 3 to about 60% by weight of a carbon conductor and about 0.1 to about 2% by weight of an organic curing agent to form a paint, applying said paint to a dielectric base and firing said paint onto said dielectric base at a temperature of at least 700°F for at least 6 months.

19. The method as defined in claim 18 wherein said paint is applied to said substrate by a screening method.

20. The method as defined in claim 18 wherein said paint is permitted to gel on said substrate prior to firing.

21. The method as defined in claim 18 wherein said temperature of 700°F constitutes a peak temperature heat zone and further including two lower temperature heat treatment zones having temperatures of about 230°C and 280°C before and after said peak zone with said peak zone being effected over a period of time of about 6 minutes.

22. A method as defined in claim 21 wherein said entire heat treatment zones are effected in about 1 hour.

23. The method as defined in claim 21 wherein said thermosetting acrylic resin is present in an amount of about 42 to about 52% by weight.

24. The method as defined in claim 18 wherein an inorganic filler material composed of alumina is admixed with said resin and said carbon conductor is present in the range of about 5 to about 50% by weight.

* * * * *

UNITED STATES PATENT OFFICE
CERTIFICATE OF CORRECTION

PATENT NO. : 3,907,717
DATED : September 23, 1975
INVENTOR(S) : James Michael Hebert It is certified that error appears in the above-identified patent and that said Letters Patent are hereby corrected as shown below:

Column 8, line 7    "months." should read --minutes.--

Signed and Sealed this twenty-fourth Day of February 1976

[SEAL]

Attest:

RUTH C. MASON
Attesting Officer

C. MARSHALL DANN
Commissioner of Patents and Trademarks